United States Patent
Subrahmanyam et al.

(10) Patent No.: US 10,474,550 B2
(45) Date of Patent: Nov. 12, 2019

(54) HIGH AVAILABILITY FOR PERSISTENT MEMORY

(71) Applicant: VMware, Inc., Palo Alto, CA (US)

(72) Inventors: Pratap Subrahmanyam, Saratoga, CA (US); Rajesh Venkatasubramanian, San Jose, CA (US); Kiran Tati, Santa Clara, CA (US); Qasim Ali, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 25 days.

(21) Appl. No.: 15/586,020

(22) Filed: May 3, 2017

(65) Prior Publication Data
US 2018/0322023 A1     Nov. 8, 2018

(51) Int. Cl.
*G06F 11/00* (2006.01)
*G06F 11/20* (2006.01)
*G06F 12/0804* (2016.01)
*G06F 1/30* (2006.01)
*G06F 11/14* (2006.01)

(52) U.S. Cl.
CPC .......... *G06F 11/2094* (2013.01); *G06F 1/30* (2013.01); *G06F 11/1446* (2013.01); *G06F 11/1464* (2013.01); *G06F 12/0804* (2013.01); *G06F 2201/805* (2013.01); *G06F 2201/82* (2013.01); *G06F 2212/1032* (2013.01)

(58) Field of Classification Search
CPC .......... G06F 11/1471; G06F 11/1458; G06F 11/1464; G06F 11/1469; G06F 11/1446; G06F 11/1456; G06F 11/2094; G06F 11/2046; G06F 11/2053; G06F 1/30; G06F 1/305; G06F 12/0804; G06F 2201/805; G06F 2201/82; G06F 2212/1032

See application file for complete search history.

(56) References Cited

U.S. PATENT DOCUMENTS

| 6,901,298 B1 | 5/2005 | Govindaraj et al. |
| 7,720,806 B2 | 5/2010 | Piedmonte |
| 7,971,081 B2 | 6/2011 | Cooper et al. |

(Continued)

FOREIGN PATENT DOCUMENTS

WO     2016122471 A1     8/2016

OTHER PUBLICATIONS

Doug Voigt. RDMA requirements for high availability in the NVM programming model. https://www.snia.org/sites/default/files/DougVoigt_RDMA_Requirements_for_HA.pdf. Storagae Developer Conference, Santa Clara, 2016.

(Continued)

*Primary Examiner* — Marc Duncan

(57) ABSTRACT

Techniques for implementing high availability for persistent memory are provided. In one embodiment, a first computer system can detect an alternating current (AC) power loss/cycle event and, in response to the event, can save data in a persistent memory of the first computer system to a memory or storage device that is remote from the first computer system and is accessible by a second computer system. The first computer system can then generate a signal for the second computer system subsequently to initiating or completing the save process, thereby allowing the second computer system to restore the saved data from the memory or storage device into its own persistent memory.

24 Claims, 6 Drawing Sheets

(56) References Cited

U.S. PATENT DOCUMENTS

| | | | |
|---|---|---|---|
| 8,826,273 | B1 | 9/2014 | Chen |
| 8,943,498 | B2 | 1/2015 | Frank |
| 9,164,856 | B2* | 10/2015 | Harpaz ............... G06F 11/2094 |
| 9,231,923 | B1 | 1/2016 | Cignetti et al. |
| 9,280,467 | B1 | 3/2016 | Kanteti et al. |
| 9,342,423 | B2 | 5/2016 | Judd |
| 9,645,901 | B2* | 5/2017 | Nagaraj ............... G06F 11/2038 |
| 9,703,706 | B2 | 7/2017 | Bagal et al. |
| 9,940,149 | B2 | 4/2018 | Mathews et al. |
| 9,946,610 | B2 | 4/2018 | Kinoshita |
| 9,996,291 | B1 | 6/2018 | Izhar et al. |
| 10,042,651 | B2 | 8/2018 | Kirvan et al. |
| 10,095,438 | B2 | 10/2018 | Berke et al. |
| 2004/0215911 | A1 | 10/2004 | Ouren et al. |
| 2005/0132150 | A1 | 6/2005 | Jewell et al. |
| 2011/0202728 | A1 | 8/2011 | Nichols et al. |
| 2012/0137289 | A1 | 5/2012 | Nolterieke et al. |
| 2012/0254864 | A1 | 10/2012 | Bork et al. |
| 2014/0189198 | A1 | 7/2014 | Siddiqi et al. |
| 2014/0195480 | A1 | 7/2014 | Talagala et al. |
| 2014/0365707 | A1 | 12/2014 | Talagala et al. |
| 2015/0039815 | A1 | 2/2015 | Klein |
| 2016/0098338 | A1 | 4/2016 | Khatri et al. |
| 2016/0378623 | A1* | 12/2016 | Kumar .................. G06F 3/0685 714/3 |
| 2017/0060697 | A1 | 3/2017 | Berke et al. |
| 2017/0212573 | A1 | 7/2017 | Kelly et al. |
| 2018/0004561 | A1 | 1/2018 | Liguori et al. |
| 2018/0074968 | A1* | 3/2018 | Bk ........................ G06F 3/0641 |
| 2018/0095879 | A1* | 4/2018 | Han .................... G06F 12/0804 |
| 2018/0107596 | A1* | 4/2018 | Kelly .................. G06F 12/0804 |
| 2018/0239725 | A1* | 8/2018 | Kumar .................... G06F 13/28 |

OTHER PUBLICATIONS

A. Dragojević, D. Narayanan, O. Hodson, and M. Castro. FaRM: Fast remote memory. In Symposium on Networked Systems Design and Implementation, pp. 401-414, 2014.
A. Dragojević, D. Narayanan, E. B. Nightingale, M. Renzelmann, A. Shamis, A. Badam, and M. Castro. No compromises: Distributed transactions with consistency, availability, and performance. In ACM Symposium on Operating Systems Principles, pp. 54-70, 2015.
M. Friedman, M. Herlihy, V. Marathe, and E. Petrank. Brief Announcement: A Persistent Lock-Free Queue for Non-Volatile Memory. In International Symposium on Distributed Computing, vol. 91, pp. 50:1-50:4, 2017.
Intel. 3D XPointTM Unveiled—The Next Breakthrough in Memory Technology. http://www.intel.com/content/www/us/en/architecture-and-technology/3d-xpoint-unveiled-video.html.
Intel. Intel architecture instruction set extensions programming reference. https://software.intel.com/sites/default/files/managed/69/78/319433-025.pdf, pp. 24-104, Jul. 2012.
Viyojit: Decoupling battery and DRAM capacities for batterybacked DRAM. In International Symposium on Computer Architecture, pp. 613-626, Jun. 2017.
A. Kolli, S. Pelley, A. Saidi, P. M. Chen, and T. F. Wenisch. High-performance transactions for persistent memories. In International Conference on Architectural Support for Programming Languages and Operating Systems, pp. 399-411, 2016.
A. Kolli, J. Rosen, S. Diestelhorst, A. G. Saidi, S. Pelley, S. Liu, P. M. Chen, and T. F. Wenisch. Delegated persist ordering. In International Symposium on Microarchitecture, pp. 1-13, 2016.
A. Kolli, V. Gogte, A. G. Saidi, S. Diestelhorst, P. M. Chen, S. Narayanasamy, and T. F. Wenisch. Language-level persistency. In International Symposium on Computer Architecture, pp. 481-493, 2017.
E. Kultursay, M. Kandemir, A. Sivasubramaniam, and O. Mutlu. Evaluating STT-RAM as an energy-efficient main memory alternative. In International Symposium on Performance Analysis of Systems and Software, 2013.
J. Zhao, O. Mutlu, and Y. Xie. FIRM: Fair and High-Performance Memory Control for Persistent Memory Systems. In International Symposium on Microarchitecture, 2014.
HammerDB benchmark. https://www.hammerdb.coml. Site updated Apr. 2018.
HPE scalable persistent memory. https://www.hpe.com/us/en/servers/persistent-memory.html. Uploaded Aug. 17, 2018.
Intel Xeon processor E7 family: Reliability, availability, and serviceability. https://www.intel.com/content/www/us/en/processors/xeon/xeon-e7-family-ras-server-paper.html. Copyright 2011.
Micron NVDIMMs: Persistent memory performance. https://www.micron.com/~/media/documents/products/product-flyer/nvdimm\_flyer.pdf. 2016.
Persistent memory programming. http://pmem.io/. Dec. 2017.
NVM programming model (NPM). https://www.snia.org/tech\_activities/standards/curr\_standards/npm. Dec. 2013.
Sysbench benchmark. https://github.com/akopytov/sysbench. Copyright 2018.
Magic quadrant for x86 server virtualization infrastructure. https://www.gartner.com/doc/2788024/magic-quadrant-x-server-virtualization, Jul. 2014 (republished Aug. 2016).
Intel and Micron Produce Breakthrough Memory Technology. New Class of Memory Unleashes the Performance of PCs, Data Centers and More. http://files.shareholder.com/downloads/ABEA-45YXOQ/5284651856x0x841530/7852AA28-4E57-4D8F-A180-FA135F0BC406/Micron-Intel\_Next\_Gen\_NVM\_Press\_Release\_FINAL\_072815.pdf. 2015.
J. Arulraj, A. Pavlo, and S. R. Dulloor. Let's talk about storage & recovery methods for non-volatile memory database systems. In International Conference on Management of Data, pp. 707-722, 2015.
E. Berg and E. Hagersten. StatCache: A probabilistic approach to efficient and accurate data locality analysis. In International Symposium on Performance Analysis of Systems and Software, pp. 20-27, Mar. 2004.
K. Bhandari, D. R. Chakrabarti, and H.-J. Boehm. Makalu: Fast recoverable allocation of non-volatile memory. In Objectoriented Programming, Systems, Languages, and Applications, pp. 677-694, 2016.
H.-J. Boehm and D. R. Chakrabarti. Persistence programming models for non-volatile memory. In International Symposium on Memory Management, pp. 55-67, 2016.
D. R. Chakrabarti, H.-J. Boehm, and K. Bhandari. Atlas: Leveraging locks for non-volatile memory consistency. In Object-oriented Programming, Systems, Languages, and Applications, 2014.
J. Coburn, A. M. Caulfield, A. Akel, L. M. Grupp, R. K. Gupta, R. Jhala, and S. Swanson. Nv-heaps: Making persistent objects fast and safe with next-generation, non-volatile memories. In International Conference on Architectural Support for Programming Languages and Operating Systems, 2011.
S. Lai. Current status of the phase change memory and its future. In International Electron Devices Meeting, 2003.
B. C. Lee, E. Ipek, O. Mutlu, and D. Burger. Architecting Phase Change Memory As a Scalable DRAM Alternative. In International Symposium on Computer Architecture, 2009.
B. C. Lee, P. Zhou, J. Yang, Y. Zhang, B. Zhao, E. Ipek, O. Mutlu, and D. Burger. Phase Change Technology and the Future of Main Memory. International Symposium on Microarchitecture, 2010.
V. J. Marathe, M. Seltzer, S. Byan, and T. Harris. Persistent memcached: Bringing legacy code to byte-addressable persistent memory. In USENIX Workshop on Hot Topics in Storage, Santa Clara, CA, 2017.
I. Moraru, D. G. Andersen, M. Kaminsky, N. Tolia, P. Ranganathan, and N. Binkert. Consistent, durable, and safe memory management for byte-addressable non volatile main memory. In SIGOPS Conference on Timely Results in Operating Systems, 2013.
S. Nalli, S. Haria, M. D. Hill, M. M. Swift, H. Volos, and K. Keeton. An analysis of persistent memory use with whisper. In International Conference on Architectural Support for Programming Languages and Operating Systems, pp. 135-148, 2017.

(56) References Cited

OTHER PUBLICATIONS

D. Narayanan and O. Hodson. Whole-system Persistence. In International Conference on Architectural Support for Programming Languages and Operating Systems, pp. 401-410, New York, NY, USA, 2012.
F. Nawab, J. Izraelevitz, T. Kelly, C. B. M. III, D. R. Chakrabarti, and M. L. Scott. Dali: A Periodically Persistent Hash Map. In International Symposium on Distributed Computing, vol. 91, pp. 37:1-37:16, 2017.
S. Pelley, P. M. Chen, and T. F.Wenisch. Memory Persistency. In International Symposium on Computer Architecture, 2014.
J. Ren, J. Zhao, S. Khan, J. Choi, Y. Wu, and O. Mutlu. ThyNVM: Enabling software-transparent crash consistency in persistent memory systems. In International Symposium on Microarchitecture, 2015.
Rob Davis, Chet Douglas, Paul Grun, Tom Talpey. Persistent memory over fabrics. https://www.flashmemorysummit.com/English/Collaterals/Proceedings/2017/20170809_FR22_Davis.pdf. 2017.
Y. Shan, S. Tsai, and Y. Zhang. Distributed shared persistent memory. In ACM Symposium on Cloud Computing, pp. 323-337, 2017.
D. B. Strukov, G. S. Snider, D. R. Stewart, and R. S.Williams. The missing memristor found. Nature, 2008.
A. S. Tanenbaum and H. Bos. Modern operating systems. Prentice Hall Press, 4th edition, 2014.
S. Venkataraman, N. Tolia, P. Ranganathan, and R. H. Campbell. Consistent and durable data structures for non-volatile byte-addressable memory. In USENIX Conference on File and Storage Technologies, 2011.
H. Volos, A. J. Tack, and M. M. Swift. Mnemosyne: Lightweight persistent memory. In International Conference on Architectural Support for Programming Languages and Operating Systems, 2011.
C. A. Waldspurger, N. Park, A. Garthwaite, and I. Ahmad. Efficient MRC construction with SHARDS. In USENIX Conference on File and Storage Technologies, pp. 95-110, Feb. 2015.
J. Xu and S. Swanson. Nova: A log-structured file system for hybrid volatile/non-volatile main memories. In USENIX conference on File and Storage Technologies, pp. 323-338, 2016.
J. Xu, L. Zhang, A. Memaripour, A. Gangadharaiah, A. Borase, T. B. D. Silva, S. Swanson, and A. Rudoff. Novafortis: A fault-tolerant non-volatile main memory file system. In ACM Symposium on Operating Systems Principles, pp. 478-496, 2017.
Y. Zhang, J. Yang, A. Memaripour, and S. Swanson. Mojim: A reliable and highly-available non-volatile memory system. In International Conference on Architectural Support for Programming Languages and Operating Systems, pp. 3-18, 2015.

\* cited by examiner

HIGH AVAILABILITY FOR PERSISTENT MEMORY

CROSS-REFERENCES TO RELATED APPLICATIONS

The present application is related to commonly-owned U.S. patent application Ser. No. 15/586,109, filed concurrently herewith, entitled "OS/Hypervisor-Based Persistent Memory." This related application, referred to herein as "D382," is incorporated by reference in its entirety for all purposes.

BACKGROUND

Unless otherwise indicated, the approaches described in this section are not prior art to the claims of the present application and are not admitted to be prior art by inclusion in this section.

Traditional computer systems include byte-addressable volatile memory (e.g., dynamic random access memory, or DRAM) and block-addressable nonvolatile storage devices such as solid state disks (SSDs) and magnetic disks. A typical program reads data from nonvolatile storage, stores and modifies the data in volatile memory, and then writes the modified data back to nonvolatile storage using block-based commands.

Persistent memory is an emerging technology that offers fast, byte-level access to data in a manner similar to DRAM, but is nonvolatile in nature. Thus, with persistent memory, software applications can access and modify individual bytes of data in-place using regular memory load and store instructions, and at the same time be assured that the data will be preserved and can continue to be accessed after, e.g., an AC (alternating current) power failure or other event that causes the system motherboard to lose or cycle AC power (e.g., a cold or hot reboot).

There are a number of implementations of persistent memory that are based on new physical memory types, such as phase-change memory (PCM) and magnetoresistive RAM. There are also approaches that implement persistent memory using a battery, conventional DRAM, and a conventional nonvolatile storage or memory device. These approaches are collectively referred to herein as "battery-backed persistent memory." With battery-backed persistent memory, a portion of the computer system's DRAM is allocated and exposed to running applications as persistent memory. This exposed allocation is not "true" persistent memory in the sense that the DRAM itself is still volatile. However, when an AC power loss/cycle event occurs, the contents of the persistent memory allocation in DRAM are saved to the nonvolatile storage device while the computer system continues to run on battery power. Then, when AC power is restored and the system is powered on again, the saved data is read from the nonvolatile storage device and placed back into the persistent memory allocation in DRAM, thereby restoring that data for use by applications.

One type of battery-backed persistent memory, known as "OS/hypervisor-based persistent memory," relies on the operating system (OS) or hypervisor of the computer system to perform the save and restore operations described above. Additional details regarding the OS/hypervisor-based approach are described in related application D382.

One limitation with persistent memory implementations in general is that they are not explicitly designed to make persistent memory data highly available—in other words, they are not designed to allow the contents of a persistent memory of a first computer system to be restored on, and thus accessible by, a second computer system while the first computer system is in a failed state (e.g., suffering from an AC power failure). As a result, users and applications cannot access that data until the first computer system recovers from the failure and is restarted.

SUMMARY

Techniques for implementing high availability for persistent memory are provided. In one embodiment, a first computer system can detect an alternating current (AC) power loss/cycle event and, in response to the event, can save data in a persistent memory of the first computer system to a memory or storage device that is remote from the first computer system and is accessible by a second computer system. The first computer system can then generate a signal for the second computer system subsequently to initiating or completing the save process, thereby allowing the second computer system to restore the saved data from the memory or storage device into its own persistent memory.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques that enable computer systems that implement persistent memory (and in particular, battery-backed persistent memory) to also support high availability (HA) of their respective persistent memory allocations. Stated another way, these techniques allow the persistent memory of a first computer system to be restored on a second computer system when the first computer system fails (e.g., loses AC power). This, in turn, enables applications, virtual machines (VMs), and/or other processes on the first computer system that require access to that persistent memory to be resumed on the second computer system.

At a high level, the HA techniques of the present disclosure can involve connecting the first and second computer systems to a storage or memory device that is not local to (i.e., is remote from) the first computer system. One example of such a device is a shared nonvolatile storage device, such as a dual or multi-ported SSD or magnetic disk, an NFS (Network File System) array/server, a SAN (storage area network) array/server, or the like. Another example of such a device is a nonvolatile storage or volatile memory that is resides in the second computer system. When an AC power loss/cycle event occurs on the first computer system, the first computer system can save the data in its persistent memory to the non-local storage/memory device in an optimized manner. The first computer system can also provide a signal to the second computer system indicating that this save process is in progress (or has been completed). In response to this signal the second computer system can restore the saved data from the storage/memory device to its own persistent memory.

These and other aspects of the present disclosure are described in further detail below. It should be noted that, for illustrative purposes, the following sections describe the implementation of HA with respect to battery-backed persistent memory, such as OS/hypervisor-based persistent memory. However, one of ordinary skill in the art will appreciate that the same or substantially similar techniques may also be applied to persistent memory technologies that do not rely on a battery for persistence, such as memristors, phase change memory, Intel's 3D XPoint, and so on. Accordingly, the HA techniques of the present disclosure should be broadly construed as being applicable to all types of persistent memory known in the art.

2. Example Computer System and High-Level HA Workflow

Figure 1:
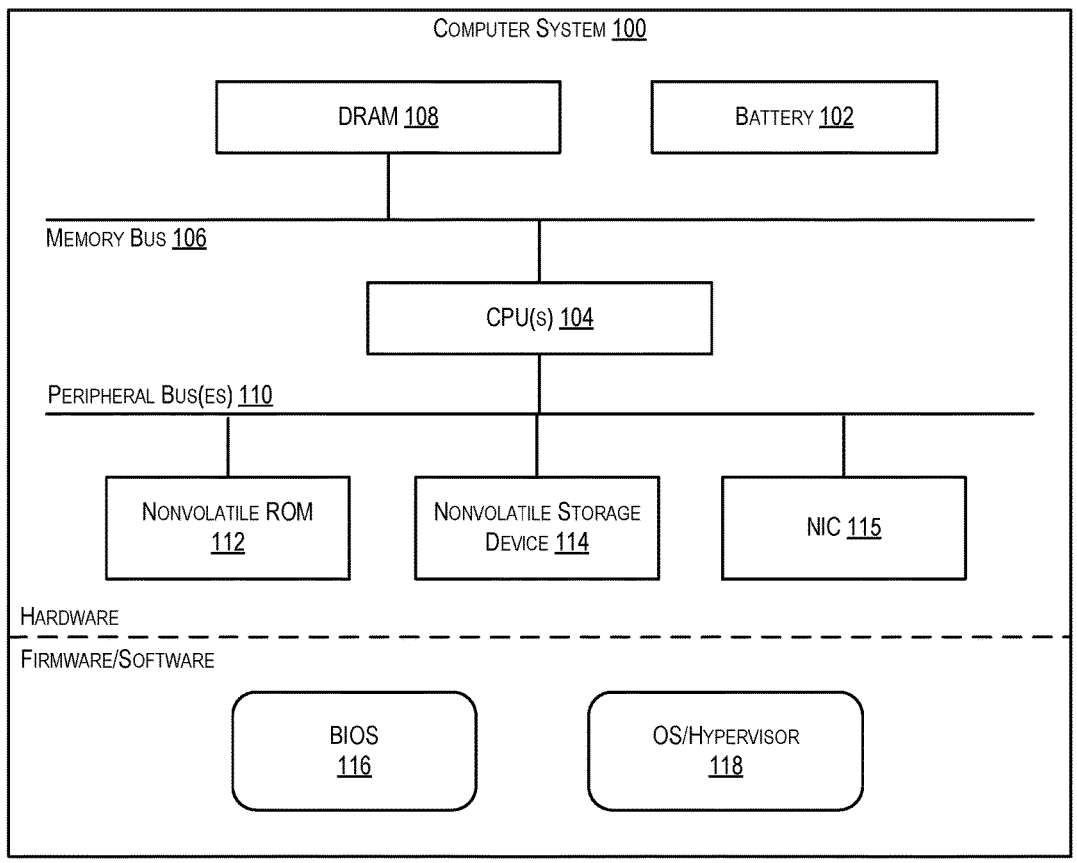
FIG. 1 depicts a computer system that implements battery-backed persistent memory according to an embodiment.

FIG. 1 is a simplified block diagram of a computer system 100 that implements battery-backed persistent memory according to an embodiment. On the hardware side, computer system 100 includes a battery 102 and one or more central processing units (CPUs) 104. CPU(s) 104 are connected, via a memory bus 106, to a byte-addressable volatile memory (i.e., DRAM) 108. CPU(s) 104 are also connected, via one or more peripheral buses 110, to a nonvolatile ROM (e.g., EEPROM or flash-based ROM) 112, a local nonvolatile storage device 114, and a network interface card (NIC) 115). Nonvolatile storage device 114 may be, e.g., an NVM Express (NVMe)-based SSD, a magnetic hard disk, or any other type of storage device known in the art.

On the firmware/software side, computer system 100 includes a system BIOS 116, which may run from nonvolatile ROM 112, and an OS/hypervisor 118, which may run from DRAM 108. Although not shown, computer system 100 can also include one or more applications or VMs that run on top of OS/hypervisor 118.

In a particular embodiment, computer system 100 can implement OS/hypervisor-based persistent memory, which is a type of battery-backed persistent memory that relies on OS/hypervisor 118 to allocate and expose a portion of DRAM 108 as persistent memory to applications. In these embodiments, OS/hypervisor 118 can detect (via, e.g., the receipt of an interrupt from BIOS 116) when an event occurs that causes computer system 100 (or more particularly, the motherboard of computer system 100) to lose AC power on a short or long term basis (e.g., an AC power failure, hot or cold reboot, etc.). In response, OS/hypervisor 118 can save the contents of the persistent memory allocation from DRAM 108 to storage device 114 while computer system 100 operates on power provided by battery 102. Then, when AC power is restored and computer system 100 is restarted, OS/hypervisor 118 can execute a corresponding restore operation that moves the saved data from the storage device 114 back into the allocated portion of DRAM 108 (described in related application D382).

In other embodiments, computer system 100 may implement or make use of other types of persistent memory, which may not necessarily be backed by a battery (e.g., Intel's 3D XPoint, phase change memory, etc.).

As noted in the Background section, although existing battery-backed and non-battery-backed persistent memory implementations work well for ensuring data persistence on a single computer system, they are not specifically designed to support persistent memory high availability (HA) across systems. Thus, if computer system 100 fails due to, e.g., an AC power failure, the persistent memory data of the system cannot be accessed by another computer system, or by computer system 100 itself, until AC power is restored and system 100 is restarted.

Figure 2:
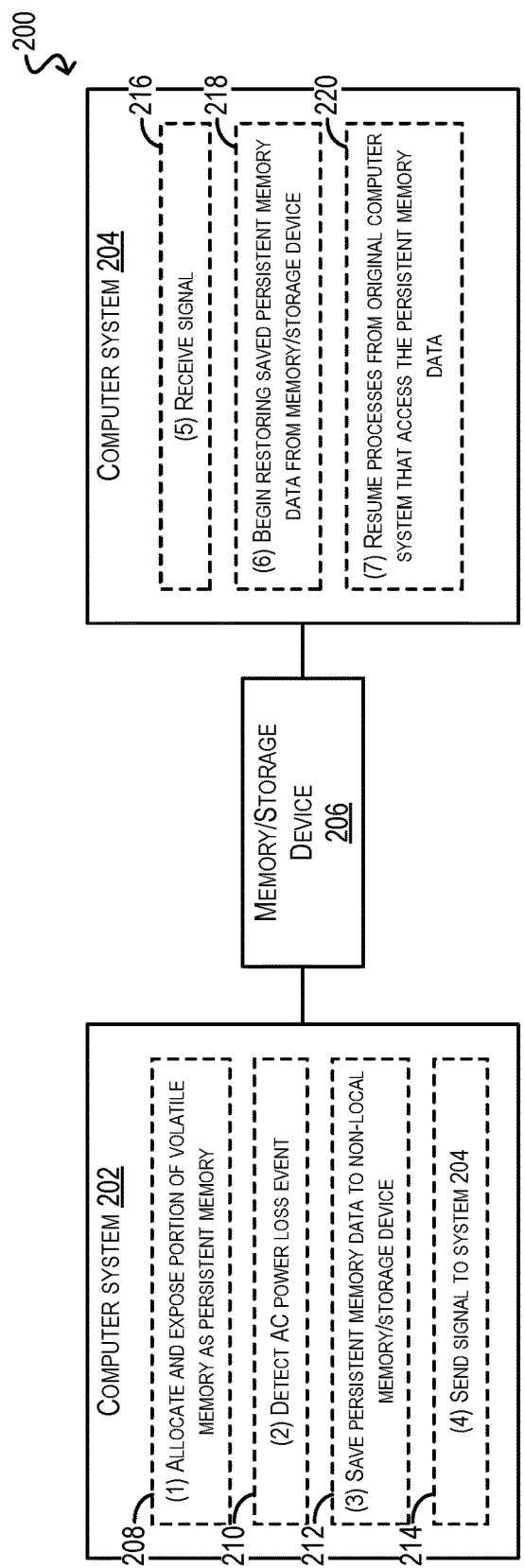
FIG. 2 depicts a high-level workflow for implementing HA for persistent memory according to an embodiment.

To address this deficiency, FIG. 2 depicts a novel HA workflow 200 that may be performed by two computer systems 202 and 204 according to an embodiment. In this example, computer systems 202 and 204 are assumed to implement battery-backed persistent memory (e.g., OS/hypervisor-based persistent memory), but in other embodiments they may implement non-battery-backed persistent memory. As shown, each computer system 202/204, which can be substantially similar to computer system 100 of FIG. 1, is connected (via, e.g., NIC 215) to a memory/storage device 206 that is not local to (i.e., is remote from) computer system 202. In one embodiment, memory/storage device 206 may be a shared storage device, such as a dual or multi-ported SSD or magnetic hard disk, a networked storage device/array (e.g., NFS-based, SAN-based, etc.), or the like. In other embodiments, memory/storage device 206 may be a device that is local to computer system 204 (e.g., a local hard disk/SSD or a local memory device/allocation of system 204). For example, memory/storage device 206 may be a persistent memory device or allocation that is resident on computer system 204.

Starting with step (1) (block 208), computer system 202 can allocate and expose a portion of its nonvolatile memory (e.g., DRAM) to running applications/VMs as persistent memory. In the case where computer system 202 implements OS/hypervisor-based persistent memory, this step can be performed by system 202's OS/hypervisor.

At step (2) (block 210), computer system 202 can detect the occurrence of an event that causes the motherboard of the system to lose or cycle AC power and thus potentially lose the contents of the persistent memory allocation in its DRAM (i.e., an "AC power loss/cycle event"). In response, computer system 202 can save one or more portions of the persistent memory allocation from DRAM to memory/storage device 206 (step (3); block 212). In certain embodiments, as part of this step, computer system 202 may only save portions of the persistent memory allocation that have been modified during system runtime in order to minimize the overall time needed for the save operation (explained in further detail below).

While computer system 202 is executing the save operation (or after it has completed the save operation), system 202 can generate a signal for computer system 204 indicating that the persistent memory allocation is being (or has been) written to memory/storage device 206 (step (4); block 214). In one embodiment, this step can comprise writing a particular marker or flag to a portion of shared storage device 206 that is monitored by computer system 204. In another embodiment, this step can comprise sending a predefined network packet or message to computer system 204.

At steps (5) and (6) (blocks 216 and 218), computer system 204 can receive the signal generated at step 214 and can begin restoring the saved data from shared storage device 206 to a persistent memory allocation within system 204's DRAM. If computer system 202 is still in the progress of saving the persistent memory data to memory/storage device 206 at this step, computer system 204 may proceed with restoring the data that has been saved and restore the remaining data on demand. Finally, at step (7) (block 218), one or more processes (e.g., application or VMs) that previously ran on computer system 202 can be started/resumed on computer system 204 and can access the restored persistent memory data.

With the high-level workflow shown in FIG. 2, HA can be achieved for the persistent memory allocation maintained on computer system 202, such that the persistent memory data in the allocation can be made available on computer system 204 while system 202 remains in a failed state. Further, a similar HA process can be performed in reverse (i.e., from computer system 204 to computer system 202) if a subsequent failure occurs on computer system 204. Additional details for optimizing this high-level workflow are presented in the sections that follow.

3. Optimizing HA

There are a number of challenges and difficulties with respect to implementing HA workflow 200 of FIG. 2 in particular scenarios, such as a scenario where memory/storage device 206 is specifically a shared storage device. First, since shared storage devices typically have a lower sustained write bandwidth than local/dedicated memory or storage devices, the total amount of time needed to execute the save operation at block 212 of workflow 200 can be very high, which is not ideal in a HA failover scenario.

Second, with battery-backed persistent memory, the maximum amount of persistent memory that can be supported is generally a function of (1) battery capacity and (2) the write bandwidth of the nonvolatile backing store. As noted above, shared storage devices typically have lower sustained write bandwidth than local/dedicated devices (due to a number of factors such as network latency, concurrent access by other storage clients, etc.). Thus, if computer system 202 is configured to save persistent memory data to a shared storage device rather than a local storage device (as in workflow 200), the maximum amount of persistent memory that can be supported will be substantially lower for a given battery size/capacity.

Third, even if the persistent memory allocation can be efficiently saved to a shared storage device, there should be a way to restore the saved persistent memory data from disk to the DRAM at destination computer system 204 without requiring a reboot of the system.

To address these and other similar issues, computer systems 202/204 can apply a number of optimizations which are described in turn below.

3.1 Optimizing Save

Figure 3A:
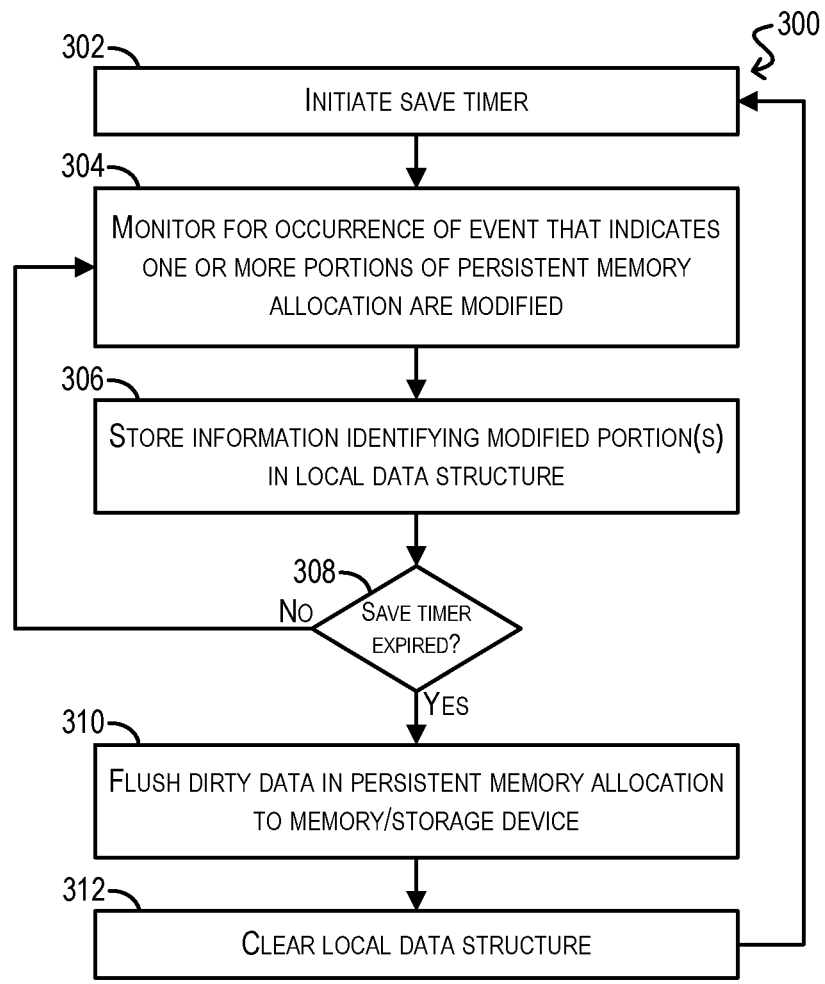
FIGS. 3A and 3B depict workflows for optimizing the saving of persistent memory data according to an embodiment.
Figure 3B:
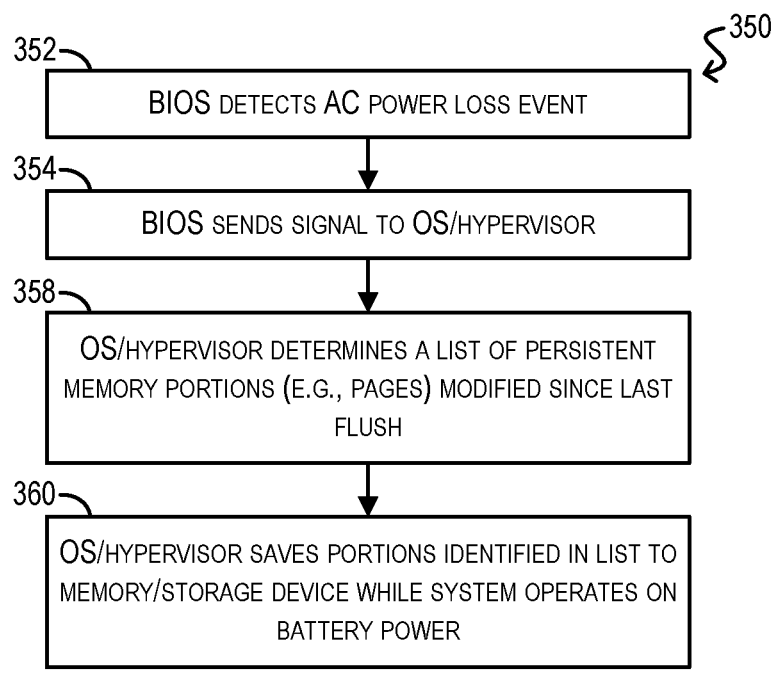

FIGS. 3A and 3B depict workflows 300 and 350 that may be executed by computer system 202 of FIG. 2 for optimizing the save operation described at block 212 according to an embodiment. These workflows assume that memory/storage device 206 is a shared storage device. With this optimization, OS/hypervisor 118 can track portions of the persistent memory allocation in DRAM that are modified (i.e., dirtied) during system runtime and flush those modified portions to shared storage device 206 on a periodic basis. Then, at the time of an AC power loss/cycle event, the computer system only needs to persist the portions of the persistent memory allocation that have been modified since the last flush operation, leading to significantly less time for completing the save operation (and thus addressing the bandwidth deficiencies of shared storage device 206).

Workflow 300 of FIG. 3A can be executed on a continuous basis while computer system 202 is running (i.e., before the occurrence of an AC power loss/cycle event per block 210 of workflow 200). Starting with block 302, the OS/hypervisor of computer system 202 can first initiate a save timer that is configured to run for a predefined time interval (e.g., 1 minute, 5 minutes, etc.). This time interval may be set automatically by the OS/hypervisor or may be user-configurable.

At block 304, while the save timer is running, the OS/hypervisor can monitor for the occurrence of an event that causes one or more portions of the persistent memory allocation in DRAM to be modified (or suggests that the one or more portions will be modified). Upon detecting such an event, the OS/hypervisor can identify the modified portion(s) and store information regarding these modified portion(s) in a local data structure (block 306).

The specific types of events that the OS/hypervisor can look for at block 304 can differ depending upon the granularity at which the OS/hypervisor is configured to track modifications to the persistent memory allocation. For example, in one set of embodiments, the OS/hypervisor may be configured to track modifications at file granularity. In these embodiments, the OS/hypervisor can monitor for a file open or modification event (by, e.g., communicating with its file system layer) and, upon detecting such an event, can store an identifier of the opened/modified file in the local data structure.

In another set of embodiments, the OS/hypervisor may be configured to track modifications at memory page granularity. In these embodiments, the OS/hypervisor can monitor for a memory page write (by, e.g., examining the dirty page bits in the OS/hypervisor's page tables) and can store an identifier of the dirty memory page in the local data structure.

At block 308, the OS/hypervisor can check whether the save timer has expired. If not, the OS/hypervisor can return to block 304 in order to monitor for further memory modification events.

If the save timer has expired at block 308, the OS/hypervisor can flush (i.e., write) all of the dirty or potentially dirty data in the persistent memory allocation (as identified in the local data structure) to the shared storage device (block 310). The OS/hypervisor can then clear the local data structure (block 312) and return to block 302 in order to re-initialize the save timer and restart the entire process.

Moving on to workflow 350 of FIG. 3B, while the main loop of workflow 300 is running, the BIOS of computer system 202 can detect that an AC power loss/cycle event has occurred (block 352). In response to this, the BIOS can send a signal (e.g., a high-priority interrupt) to the OS/hypervisor (block 354), which can cause the OS/hypervisor to determine a list of the portions (e.g., pages) of the persistent memory allocation that have been modified since the last flush operation (block 358).

Finally, at block 360, the OS/hypervisor (or some other component of the computer system) can save the dirty data identified in the list (rather than the entirety of the persistent memory allocation) to shared storage device 206. Note that the total amount of this dirty data should be relatively small because the OS/hypervisor will have already flushed the dirty data from previous time intervals, and thus the remaining dirty data will only comprise data modified in the most recent time interval.

3.2 Increasing Maximum Size of Persistent Memory

As mentioned previously, with battery-backed persistent memory, the maximum amount of DRAM than can be allocated and exposed as persistent memory is generally a function of (1) battery capacity and (2) the write bandwidth of the nonvolatile backing store. This is because the system needs to ensure that the entirety of the persistent memory allocation can be saved within the window of operational time afforded by the system's battery, and thus the allocation size is limited to X times Y, where X is the amount of data per second that the backing store can write in a sustained manner (i.e., the device's sustained write bandwidth) and Y is the number of seconds the battery can keep the system running.

In order to circumvent this cap on persistent memory size for the purposes of HA, the OS/hypervisor of computer system 202 can build upon workflow 300 of FIG. 3A and limit, via a "dirty data limit," the amount of persistent memory that is allowed to be modified by applications/VMs before those modified memory portions are flushed to storage per block 310 of workflow 300. For example, assume this dirty data limit is set to 100 gigabytes (GBs). This means that the OS/hypervisor will not allow more than 100 GBs of data in the persistent memory allocation to be dirty at any point in time, even though the total size of the persistent memory allocation may be significantly larger. As a result, the battery of computer system 202 and shared storage device 206 only need to provide enough wattage and write bandwidth respectively to ensure that 100 GB of data can be written to disk at the time of an AC power loss/cycle event. This effectively removes the physical characteristics of the battery and the backing store as limiting factors on the persistent memory size.

Figure 4:
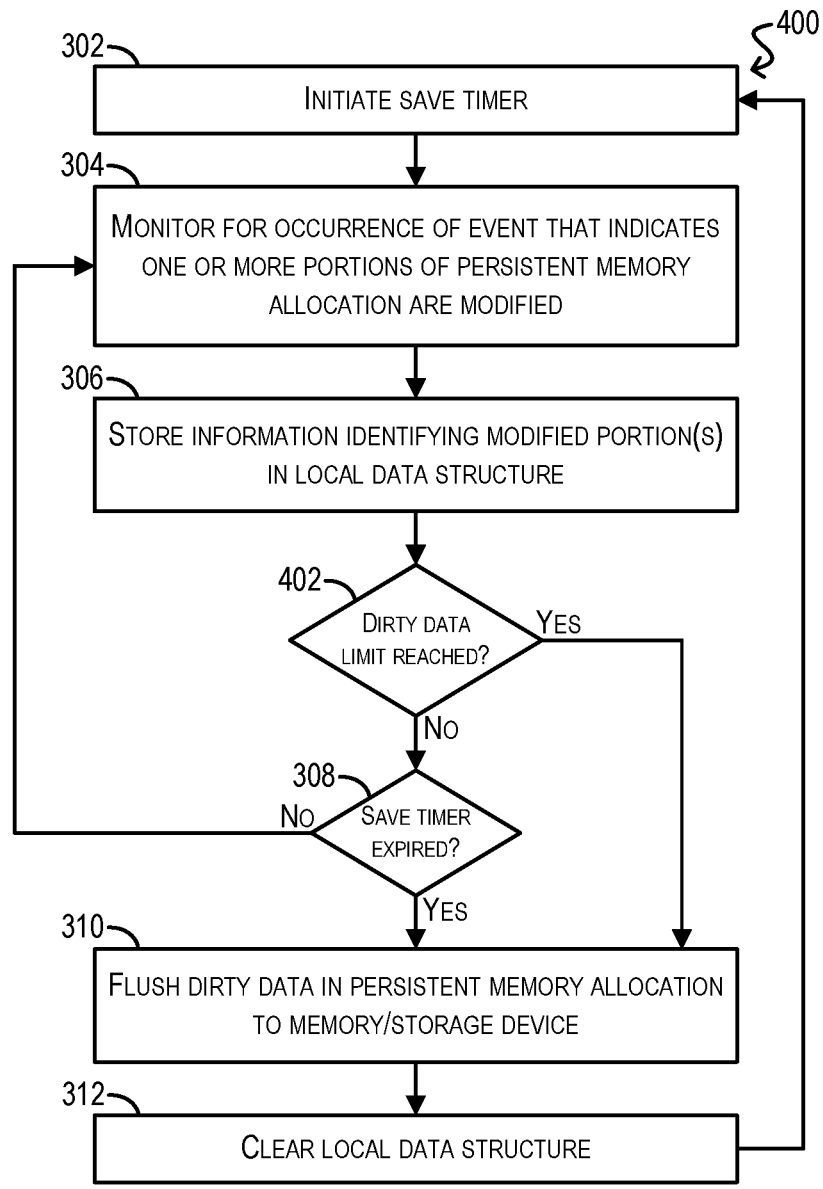
FIG. 4 depicts a workflow for implementing a dirty data limit within the workflow of FIG. 3A according to an embodiment.

FIG. 4 depicts a workflow 400 that can be executed by the OS/hypervisor of computer system 202 for implementing the dirty data limit according to an embodiment. Workflow 400 is similar to workflow 300 and is based on the same general principle of tracking portions of the persistent memory allocation that have been modified and flushing those modified portions to disk on a periodic basis. However, prior to checking whether the save timer has expired, the OS/hypervisor can check whether the dirty data limit has been reached (block 402). If the dirty data limit has not been reached, the OS/hypervisor can move on to checking the expiry of the save timer (block 308).

On the other hand, if the dirty data limit has been reached at block 402, the OS/hypervisor can immediately proceed with flushing all of the dirty data in the persistent memory allocation (block 310). In this way, the OS/hypervisor can ensure that the total amount of dirty data in the allocation does not exceed the limit. As part of this, the OS/hypervisor can slow down or suspend running processes/threads until the flushing is complete in order to avoid any additional memory writes during this period.

In certain embodiments, the value of the dirty data limit can be static. In other embodiments, the OS/hypervisor can dynamically change this value on an as-needed basis. For instance, assume that the typical sustained write bandwidth of shared storage device 206 is 3 GB per second, but the bandwidth falls to 1 GB per second for some reason (e.g., another storage client starts reading from or writing to the storage). In this scenario, the OS/hypervisor of computer system 202 can detect the drop in bandwidth and can dynamically reduce the value of the dirty data limit so that the total amount of dirty data does not exceed what can be written to device 206 using this reduced bandwidth figure (and given the system battery size). Once the write bandwidth returns to the typical 3 GB per second, the OS/hypervisor can increase the dirty data limit back to its original value. In this way, the OS/hypervisor can dynamically account for fluctuations in the write bandwidth of shared storage device 206.

3.3 Optimizing Restore

Once computer system 202 of FIG. 2 has saved its persistent memory data to memory/storage device 206, that saved data needs to be restored in the DRAM of computer system 204 so that it can accessed in a byte-addressable manner (assuming system 204 uses battery-backed persistent memory). However, some battery-backed persistent memory implementations only allow such saved data to be restored at the time of system boot.

To overcome this, in certain embodiments the BIOS/hypervisor of computer system 204 can perform the task of restoring persistent memory data from memory/storage device 206 to the system's DRAM. This offers a number of advantages; first, since the OS/hypervisor can dynamically begin the restore process at any point during system runtime, there is no need to manually boot or reboot computer system 204 in order to initiate the restore. For instance, the OS/hypervisor of computer system 204 can actively monitor for the signal generated by computer system 202 at block 214 of workflow 200 and, in response to receiving the signal, can immediately begin the process of reading the saved persistent memory data from memory/storage device 206.

Second, since the OS/hypervisor has inherent knowledge and control over how system memory is allocated and used by applications, it can carry out the restore process in an intelligent manner. For example, consider a scenario where the amount of persistent memory data saved to memory/storage device 206 by computer system 202 is 10 GB, but computer system 204 only has 4 GB of free memory in its persistent memory allocation. In this case, the OS/hypervisor of computer system 204 can dynamically change the size of the persistent memory allocation (as, e.g., a percentage of total physical DRAM) in order to accommodate the 10 GB of saved data. This can involve dynamically converting an appropriate amount of the DRAM of computer system 204 (e.g., 4 GB) to persistent memory. Alternatively, the OS/hypervisor can communicate with one or more other computer systems in order to determine their respective free persistent memory allocations and offload the restore process to a particular system that has a sufficient amount of free persistent memory.

As another example, rather than restoring all of the saved data from memory/storage device 206 at block 218 of workflow 200, the OS/hypervisor of computer system 204 can retrieve this data in a "lazy" manner while the system is running (i.e., on demand, in response to a particular memory access request).

Figure 5:
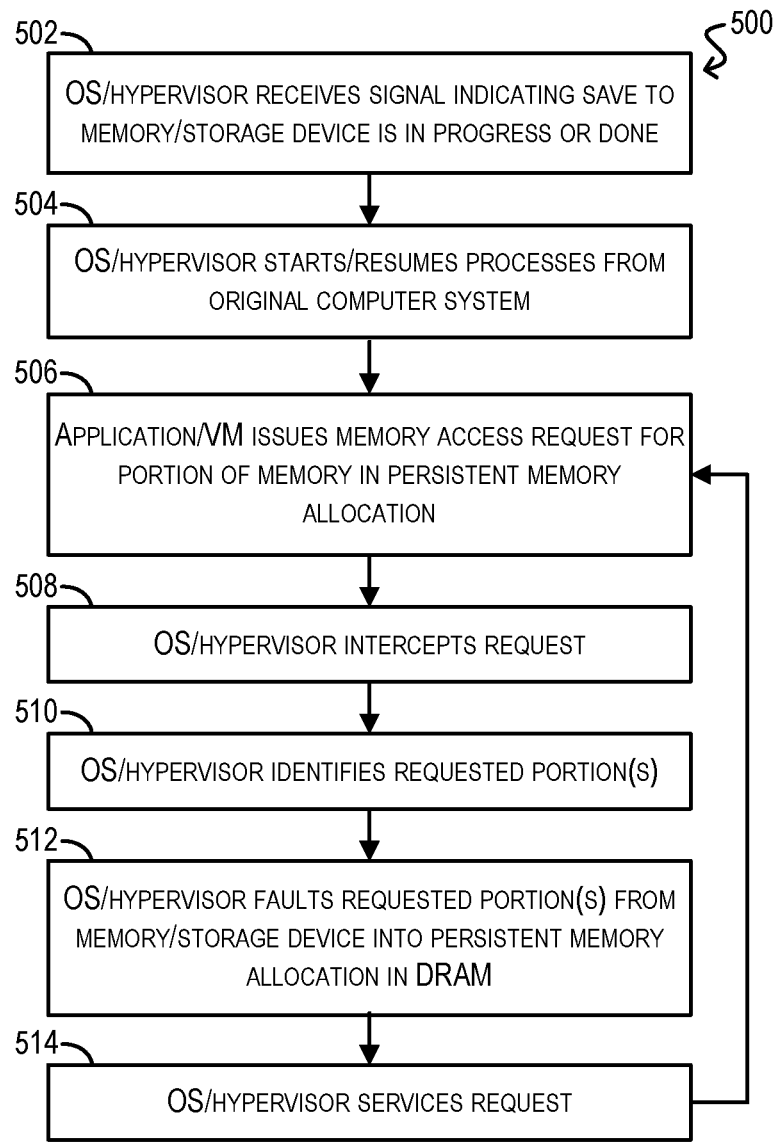
FIG. 5 depicts a workflow for optimizing the restoration of persistent memory data according to an embodiment.

FIG. 5 depicts a workflow 500 illustrating this optimized restore process according to an embodiment. At block 502, the OS/hypervisor of computer system 204 can receive the signal generated at step 214 of workflow 200 indicating that computer system 202 is saving (or has saved) its persistent memory data to memory/storage device 206. However, rather than restoring the saved data from device 206 to DRAM at this point, the data can be kept on disk. The OS/hypervisor can then start/resume one or more applications or VMs that previously ran on computer system 202 (block 504).

At block 506, an application or VM can issue a memory access request for a particular portion of memory (e.g., one or more memory pages) that is in the saved persistent memory data. In response, the OS/hypervisor can intercept the memory access request (block 508), identify the requested portion(s) (block 510), and restore (i.e., fault) those specific portion(s) from memory/storage device 206 into the DRAM of computer system 204 (block 512). The OS/hypervisor can then continue with servicing the request (block 514), and this process can repeat until all of the persistent memory data is restored in DRAM.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing high availability for persistent memory, the method comprising:
   detecting, by a first computer system, an alternating current (AC) power loss or cycle event;
   in response to the detecting, saving, by the first computer system, data in a persistent memory of the first computer system to a memory or storage device that is remote from the first computer system and is accessible by a second computer system; and
   generating, by the first computer system, a signal for the second computer system after initiating the saving,
   wherein the signal causes the second computer system to:
      intercept a memory access request directed to a particular portion of the saved data; and
      in response to the intercepting, restore the particular portion from the memory or storage device to a persistent memory of the second computer system.

2. The method of claim 1 wherein the persistent memory of the first computer system is allocated from a volatile memory of the first computer system.

3. The method of claim 1 further comprising, prior to detecting the AC power loss or cycle event:
   tracking one or more portions of the persistent memory of the first computer system that are modified during runtime of the first computer system; and
   periodically flushing the one or more portions to the memory or storage device.

4. The method of claim 3 wherein, upon detecting the AC power loss or cycle event, an operating system (OS) or hypervisor of the first computer system saves, to the memory or storage device, data in the persistent memory of the first computer system that has been modified but not yet flushed.

5. The method of claim 3 wherein an OS or hypervisor of the first computer system ensures that an amount of modified data in the persistent memory of the first computer system that has not been flushed to the memory or storage device does not exceed a threshold.

6. The method of claim 5 wherein the threshold is dynamically increased or decreased during the runtime of the first computer system in response to a change in write bandwidth of the memory or storage device.

7. The method of claim 1 wherein the memory or storage device is local to the second computer system.

8. A non-transitory computer readable storage medium having stored thereon program code executable by a first computer system, the program code embodying a method for implementing high availability for persistent memory, the method comprising:
- detecting an alternating current (AC) power loss or cycle event;
- in response to the detecting, saving data in a persistent memory of the first computer system to a memory or storage device that is remote from the first computer system and is accessible by a second computer system; and
- generating a signal for the second computer system after initiating the saving
- wherein the signal causes the second computer system to:
  - intercept a memory access request directed to a particular portion of the saved data; and
  - in response to the intercepting, restore the particular portion from the memory or storage device to a persistent memory of the second computer system.

9. The non-transitory computer readable medium of claim 8 wherein the persistent memory of the first computer system is allocated from a volatile memory of the first computer system.

10. The non-transitory computer readable storage medium of claim 8 wherein the method further comprises, prior to detecting the AC power loss or cycle event:
- tracking one or more portions of the persistent memory of the first computer system that are modified during runtime of the first computer system; and
- periodically flushing the one or more portions to the memory or storage device.

11. The non-transitory computer readable storage medium of claim 10 wherein, upon detecting the AC power loss or cycle event, an operating system (OS) or hypervisor of the first computer system saves, to the memory or storage device, data in the persistent memory of the first computer system that has been modified but not yet flushed.

12. The non-transitory computer readable storage medium of claim 10 wherein an OS or hypervisor of the first computer system ensures that an amount of modified data in the persistent memory of the first computer system that has not been flushed to the memory or storage device does not exceed a threshold.

13. The non-transitory computer readable storage medium of claim 12 wherein the threshold is dynamically increased or decreased during the runtime of the first computer system in response to a change in write bandwidth of the memory or storage device.

14. The non-transitory computer readable storage medium of claim 8 wherein the memory or storage device is local to the second computer system.

15. A computer system comprising:
- a battery;
- a BIOS (Basic Input/Output System);
- an operating system (OS) or hypervisor;
- a volatile memory; and
- a non-transitory computer readable medium having stored thereon program code for implementing high availability for persistent memory, the program code causing the computer system to:
  - detect an alternating current (AC) power loss or cycle event;
  - in response to the detecting, save data in a persistent memory of the computer system to a memory or storage device that is remote from the computer system and is accessible by another computer system; and
  - generate a signal for said another computer system after initiating the saving,
  - wherein the signal causes said another computer system to:
    - intercept a memory access request directed to a particular portion of the saved data; and
    - in response to the intercepting, restore the particular portion from the memory or storage device to a persistent memory of the second computer system.

16. The computer system of claim 15 wherein the persistent memory of the computer system is allocated from the volatile memory of the computer system.

17. The computer system of claim 15 wherein the program code further causes the computer system to, prior to detecting the AC power loss or cycle event:
- track one or more portions of the persistent memory of the computer system that are modified during runtime of the computer system; and
- periodically flush the one or more portions to the memory or storage device.

18. The computer system of claim 17 wherein, upon detecting the AC power loss or cycle event, the OS or hypervisor saves, to the memory or storage device, data in the persistent memory of the computer system that has been modified but not yet flushed.

19. The computer system of claim 17 wherein the OS or hypervisor ensures that an amount of modified data in the persistent memory of the computer system that has not been flushed to the memory or storage device does not exceed a threshold.

20. The computer system of claim 19 wherein the threshold is dynamically increased or decreased during the runtime of the computer system in response to a change in write bandwidth of the memory or storage device.

21. The computer system of claim 15 wherein the memory or storage device is local to said another computer system.

22. A method for implementing high availability for persistent memory, the method comprising:
- tracking, by a first computer system, one or more portions of a persistent memory that are modified during runtime of the first computer system;
- periodically flushing, by the first computer system, the one or more portions to a memory or storage device that is remote from the first computer system and is accessible by a second computer system;
- detecting, by the first computer system, an alternating current (AC) power loss or cycle event;
- in response to the detecting, saving, by the first computer system to the memory or storage device, modified data in the persistent memory that has not yet been flushed; and
- generating, by the first computer system, a signal for the second computer system after initiating the saving,
- wherein an OS or hypervisor of the first computer system ensures that an amount of the modified data in the persistent memory that has not yet been flushed to the memory or storage device does not exceed a threshold, and
- wherein the threshold is dynamically increased or decreased during the runtime of the first computer system in response to a change in write bandwidth of the memory or storage device.

23. A non-transitory computer readable storage medium having stored thereon program code executable by a first computer system, the program code embodying a method for implementing high availability for persistent memory, the method comprising:

tracking one or more portions of a persistent memory that are modified during runtime of the first computer system;

periodically flushing the one or more portions to a memory or storage device that is remote from the first computer system and is accessible by a second computer system;

detecting an alternating current (AC) power loss or cycle event;

in response to the detecting, saving, to the memory or storage device, modified data in the persistent memory that has not yet been flushed; and generating a signal for the second computer system after initiating the saving, wherein an OS or hypervisor of the first computer system ensures that an amount of the modified data in the persistent memory that has not yet been flushed to the memory or storage device does not exceed a threshold, and wherein the threshold is dynamically increased or decreased during the runtime of the first computer system in response to a change in write bandwidth of the memory or storage device.

24. A computer system comprising:

a battery;

a BIOS (Basic Input/Output System);

an operating system (OS) or hypervisor;

a volatile memory; and a non-transitory computer readable medium having stored thereon program code for implementing high availability for persistent memory, the program code causing the computer system to:

track one or more portions of a persistent memory that are modified during runtime of the computer system;

periodically flush the one or more portions to a memory or storage device that is remote from the computer system and is accessible by another computer system;

detect an alternating current (AC) power loss or cycle event;

in response to the detecting, save, to the memory or storage device, modified data in the persistent memory that has not yet been flushed; and generate a signal for said another computer system after initiating the saving, wherein the OS or hypervisor ensures that an amount of the modified data in the persistent memory that has not yet been flushed to the memory or storage device does not exceed a threshold, and wherein the threshold is dynamically increased or decreased during the runtime of the computer system in response to a change in write bandwidth of the memory or storage device.

* * * * *